United States Patent
Fukumori

(10) Patent No.: US 9,817,672 B2
(45) Date of Patent: Nov. 14, 2017

(54) INFORMATION PROCESSING APPARATUS AND METHOD FOR CONTROLLING INFORMATION PROCESSING APPARATUS

(71) Applicant: FUJITSU LIMITED, Kawasaki-shi, Kanagawa (JP)

(72) Inventor: Masato Fukumori, Chohu (JP)

(73) Assignee: FUJITSU LIMITED, Kawasaki (JP)

( * ) Notice: Subject to any disclaimer, the term of this patent is extended or adjusted under 35 U.S.C. 154(b) by 68 days.

(21) Appl. No.: 14/634,071

(22) Filed: Feb. 27, 2015

(65) Prior Publication Data

US 2015/0277932 A1  Oct. 1, 2015

(30) Foreign Application Priority Data

Mar. 28, 2014  (JP) ................................ 2014-070339

(51) Int. Cl.
| | | |
|---|---|---|
| G06F 9/00 | (2006.01) | |
| G06F 9/24 | (2006.01) | |
| G06F 15/177 | (2006.01) | |
| G06F 9/44 | (2006.01) | |

(52) U.S. Cl.
CPC .......... *G06F 9/4401* (2013.01); *G06F 9/4416* (2013.01); *G06F 9/4411* (2013.01)

(58) Field of Classification Search
CPC ................................ G06F 9/00; G06F 15/177
See application file for complete search history.

(56) References Cited

U.S. PATENT DOCUMENTS

| | | | | |
|---|---|---|---|---|
| 6,401,198 | B1 * | 6/2002 | Harmer | ............................ 713/1 |
| 2004/0098575 | A1 | 5/2004 | Datta et al. | |
| 2004/0225874 | A1 * | 11/2004 | Burr | ..................... G06F 9/4418 713/1 |
| 2005/0283598 | A1 * | 12/2005 | Gaskins | ................ G06F 9/4403 713/2 |
| 2006/0129789 | A1 * | 6/2006 | Chu | ...................... G06F 9/4403 713/1 |
| 2006/0288202 | A1 * | 12/2006 | Doran | ................... G06F 9/4416 713/2 |
| 2008/0005549 | A1 | 1/2008 | Ke | |
| 2008/0082845 | A1 | 4/2008 | Morisawa | |

FOREIGN PATENT DOCUMENTS

| | | |
|---|---|---|
| JP | 2-121014 | 5/1990 |
| JP | 6-19718 A | 1/1994 |
| JP | 7-219684 | 8/1995 |
| JP | 11-53329 | 2/1999 |

(Continued)

OTHER PUBLICATIONS

Japanese Office Action dated Aug. 29, 2017 for corresponding Japanese Patent Application No. 2014-070339, with English Translation, 6 pages.

*Primary Examiner* — Phil Nguyen
(74) *Attorney, Agent, or Firm* — Fujitsu Patent Center

(57) ABSTRACT

A server computer includes an SDRAM and a service processor that transmits a boot firmware program. The server computer further also includes a CPU that includes a cache for the boot firmware program transmitted from the service processor to be stored in. The CPU executes the boot firmware program stored in the cache to activate the SDRAM, and performs a startup of the server computer by using the activated SDRAM.

11 Claims, 9 Drawing Sheets

(56) References Cited

FOREIGN PATENT DOCUMENTS

| JP | 2006-515940 | 6/2006 |
| JP | 2008-16020 | 1/2008 |
| JP | 2008-90436 A | 4/2008 |
| JP | 2009-217336 | 9/2009 |
| JP | 2012-198604 A | 10/2012 |

\* cited by examiner

INFORMATION PROCESSING APPARATUS AND METHOD FOR CONTROLLING INFORMATION PROCESSING APPARATUS

CROSS-REFERENCE TO RELATED APPLICATION

This application is based upon and claims the benefit of priority of the prior Japanese Patent Application No. 2014-070339, filed on Mar. 28, 2014, the entire contents of which are incorporated herein by reference.

FIELD

The embodiment discussed herein is related to an information processing apparatus, a method for controlling the information processing apparatus, and a control program of the information processing apparatus.

BACKGROUND

Recent information processing apparatuses such as a server computer often include a service processor. The service processor is an independent computer for performing remote control and management of operations of the entire information processing apparatus including a CPU (Central Processing Unit) serving as a processor. For example, the service processor performs emergency control when the server computer is in trouble, and performs starting/stopping at normal time.

A conventional information processing apparatus including a service processor will be described with reference to FIG. 9. FIG. 9 is a diagram illustrating an example of a conventional server computer including a service processor. For example, a server computer 900 includes a CPU 902 and a service processor 901, which are connected by a reset signal line 905. The CPU 902 is further connected to an SDRAM (Synchronous Dynamic Random Access Memory) 903 which is a volatile main storage device. The CPU 902 is connected with a boot ROM (Read Only Memory) 904 by a bus 906. The SDRAM 903 is an SDRAM group including a plurality of SDRAMs. The boot ROM 904 contains a boot firmware program.

The CPU 902 includes one or more cores 921 to be recognized as a single processor by a program, and a cache 922 for the SDRAM 903. The CPU 902 is connected to an IO (Input Output) controller 907 and a network interface controller 909 by a bus. The IO controller 907 is connected with an external storage device 908 such as a hard disk.

The server computer 900 performs a system reset and boot, for example, by the following procedure. The service processor 901 inputs a reset signal to the CPU 902 via the reset signal line 905. Specifically, the service processor 901 inputs 0 to the CPU 902 other than when inputting the reset signal. When inputting the reset signal, the service processor 901 changes the value input to the CPU 902 to 1. The service processor 901 then restores the value input to the CPU 902 to 0 to cancel the reset signal, and inputs an execution instruction to reset the CPU 902 to the CPU 902.

All the core(s) 921 included in the CPU 902 receive(s) the input of the reset execution instruction from the service processor 901. All the core(s) 921 start(s) an instruction fetch from a fixed address in the boot ROM 904, to which fixed physical address are assigned, and an execution instruction for startup processing. The fixed address is also referred to as a reset address.

Here, the cache 922 built in the CPU 902 operates as an SDRAM device that is accessed in a non-cacheable manner and to which fixed physical addresses are assigned.

A boot firmware program 941 serving as a program for booting the server computer 900 is stored in the reset address in the boot ROM 904. When the reset signal is cancelled, the CPU 902 executes the boot firmware program 941 stored in the boot ROM 904.

The CPU 902 executes the boot firmware program 941 to perform the following processing. Initially, a POST (Power On Self-Test) is performed to do an operation test inside the CPU 902. Next, if serious failures are not detected by the POST and operations can be continued, the SDRAM 903 is initialized and refreshing of the SDRAM 903 is started. The SDRAM 903 hereafter retains written data and operates as a main storage device. Next, the boot firmware program 941 is copied to the SDRAM 903. A data area to be used by the boot firmware program in the SDRAM 903 is initialized. The operation mode of the server computer is then changed to a mode where the cache 922 included in the CPU 902 operates as a cache of the SDRAM 903. All the core(s) 921 included in the CPU 902 execute(s) the boot firmware program stored in the SDRAM 903. The SDRAM 903 is hereafter used as a storage area of the boot firmware program and a storage area of data at boot time. The hardware other than the service processor 901, the CPU 902, the SDRAM 903, or the boot ROM 904 is then initialized. The CPU 902 reads an OS (Operating System) boot loader for I/O (Input/Output) devices, and starts to execute the read OS boot loader.

As a method for booting a computer, there is a conventional technique in which a baseboard management controller loads firmware from a memory, stores the firmware into a cache memory, and performs a boot. There is a conventional technique in which a CPU reads and stores a boot firmware program into a cache memory, and performs a boot. There is a conventional technique in which a processor for diagnosing a server computer copies a boot firmware program to a main memory device and performs a boot.

Patent Document 1: Japanese National Publication of International Patent Application No. 2006-515940
Patent Document 2: Japanese Laid-open Patent Publication No. 2008-16020
Patent Document 3: Japanese Laid-open Patent Publication No. 2009-217336

However, the conventional information processing apparatuses are provided with the boot ROM in which the boot firmware program used for booting is stored. This increases the product cost.

Even with the conventional techniques of reading the boot firmware program into a cache memory or a main storage device, the provision of the boot ROM or other storage devices containing the boot firmware program makes it difficult to reduce the product cost.

SUMMARY

According to an aspect of an embodiment, an information processing apparatus includes a main storage unit; a program transmission unit that transmits a starting program; and a processor that includes a built-in storage unit for the starting program transmitted from the program transmission unit to be stored in, executes the starting program stored in the built-in storage unit to activate the main storage unit, and performs a startup of the information processing apparatus by using the activated main storage unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. Note that the information processing apparatus, the method for controlling the information processing apparatus, and the control program of the information processing apparatus disclosed in the present application are not limited to the embodiments described below.

Figure 1:
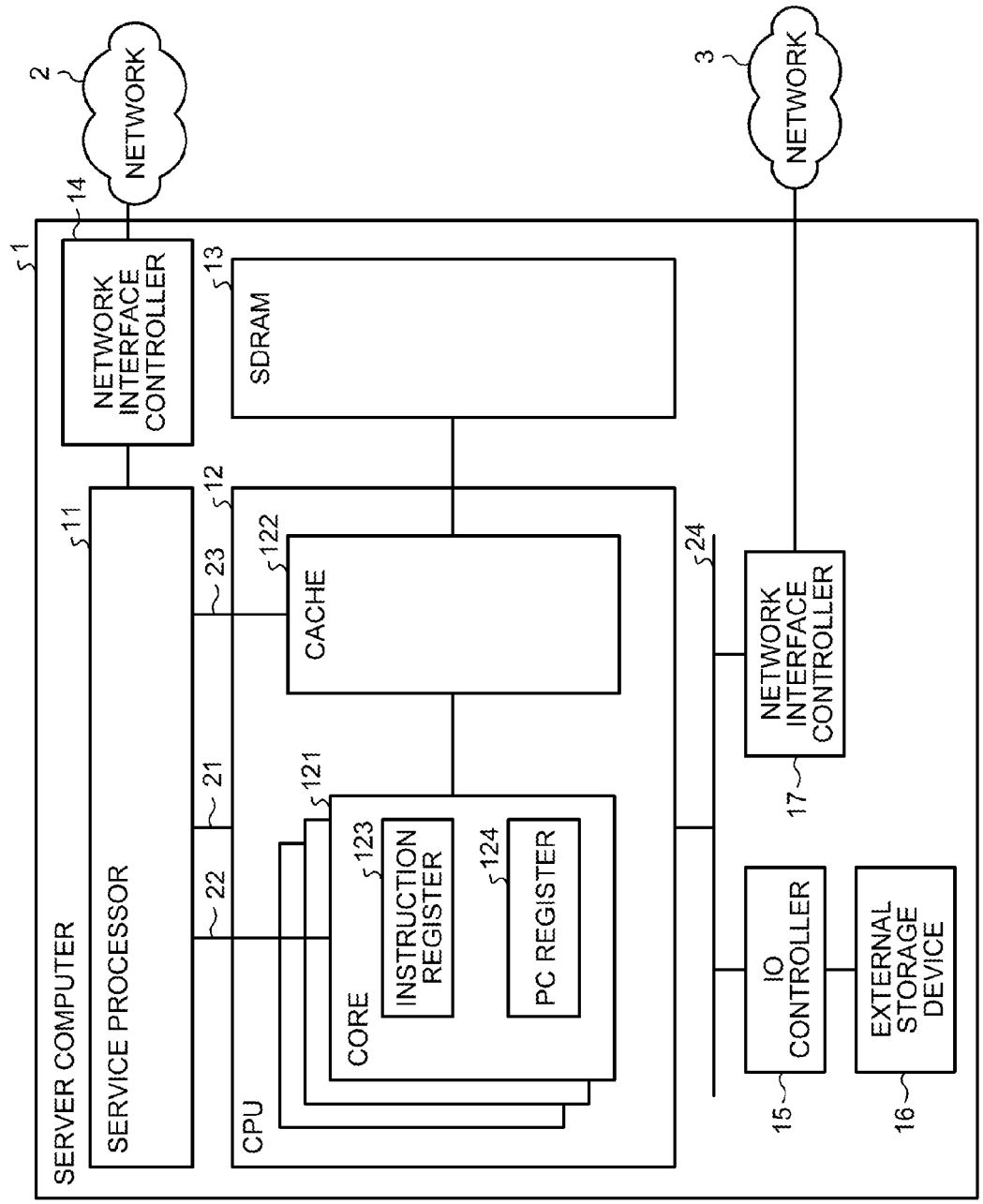
FIG. 1 is a schematic diagram illustrating a hardware configuration of a server computer according to an embodiment.

FIG. 1 is a schematic diagram illustrating a hardware configuration of a server computer according to the embodiment. A server computer 1 serving as an information processing apparatus includes a service processor 11, a CPU 12 serving as a processor, and an SDRAM 13 serving as a main storage device. The server computer 1 further includes a network interface controller 14, an IO controller 15, an external storage device 16, and a network interface controller 17.

The network interface controller 14 is an interface for connecting to a network 2.

The service processor 11 is connected with the CPU 12 by a reset signal line 21. The service processor 11 is also connected with cores 121 of the CPU 12 with an instruction fetch stop signal line 22. The service processor 11 is further connected with a cache 122 built in the CPU 12 by a CPU-SVP (Service Processor) data bus 23.

The service processor 11 is connected to the network interface controller 14.

The service processor 11 is supplied with power even when the server computer 1 is powered off. In contrast, the hardware of the server computer 1 other than the service processor 11 is supplied with power after power-on.

The service processor 11 outputs a reset signal having a value of 0 to the CPU 12 via the reset signal line 21 until a boot is performed. The service processor 11 also outputs an instruction fetch stop signal having a value of 0 to the cores 121 of the CPU 12 via the instruction fetch stop signal line 22 until a boot is performed.

The service processor 11 receives a boot instruction to the server computer 1 from an external apparatus via the network 2. In the present embodiment, the case where the service processor 11 receives the boot instruction from outside is described as an example of the case where a boot is performed. However, this is not restrictive. The processing described in the present embodiment is performed at any timing when the server computer 1 is booted. For example, a boot at power-on or under a restart instruction is also applicable.

When receiving the boot instruction to the server computer 1, the service processor 11 changes the value of the reset signal output to the CPU 12 via the reset signal line 21 to 1. This puts the CPU 12 on standby for the execution of a reset. The service processor 11 also changes the value of the instruction fetch stop signal output to the cores 121 via the instruction fetch stop signal line 22 to 1. This puts the cores 121 into a state in which an instruction fetch and instruction execution are stopped.

Next, the service processor 11 changes the value of the reset signal output to the CPU 12 via the reset signal line 21 to 0, whereby the CPU 12 is made to perform a reset.

Next, the service processor 11 obtains a boot firmware program from the network 2. Specifically, the service processor 11 obtains the boot firmware program from another server computer or the like located on the network 2. While in the present embodiment the service processor 11 obtains the boot firmware program from the network 2, this is not restrictive. For example, the service processor 11 may store the boot firmware program in advance. The boot firmware program corresponds to an example of the "starting program."

The service processor 11 then transmits and stores the boot firmware program into the cache 122 built in the CPU 12 via the CPU-SVP data bus 23.

Next, the service processor 11 changes the instruction fetch stop signal output to the cores 121 via the instruction fetch stop signal line 22 to 0. As a result, the cores 121 start an instruction fetch and instruction execution. The service processor 11 corresponds to an example of the "program transmission unit."

The SDRAM 13 is an SDRAM group including a plurality of SDRAMs which are volatile main storage devices. After the SDRAM 13 is initialized and starts being refreshed by the cores 121, the SDRAM 13 retains written data and operates as a main storage device.

The CPU 12 includes the plurality of cores 121 and the cache 122. Each core 121 and the cache 122 are connected by an internal bus. The cache 122 is connected to the SDRAM 13. Note that such a connection is just an example. For example, the cores 121 and the SDRAM 13 may be directly connected. The cache 122 corresponds to an example of the "built-in storage unit."

The CPU 12 is further connected to the IO controller 15 and the network interface controller 17 via a bus 24.

If the value of the reset signal input from the service processor 11 changes from 1 to 0, the CPU 12 resets the entire CPU 12. Specifically, the CPU 12 instructs the cores 121 to make their program counters (PCs) point at a reset address. The reset address is a fixed address of the cache 122 operating as an SDRAM. The CPU 12 also instructs the cache 122 to operate as an SDRAM that has a fixed reset address and is accessed in a non-cacheable manner.

The cores 121 include an instruction register 123 and a PC register 124 each. The cores 121 receive the input of the instruction fetch stop signal having a value of 1 from the service processor 11 via the instruction fetch stop signal line 22. While receiving the instruction fetch stop signal having a value of 1, the cores 121 continue stopping an instruction fetch and instruction execution.

The cores 121 receive an instruction from the CPU 12 to make their PCs point at the reset address of the cache 122. The cores 121 then set the PCs retained in the PC registers 124 to point at the reset address of the cache 122.

The cores 121 then receive the input of the instruction fetch stop signal having a value of 0 from the service processor 11 via the instruction fetch stop signal line 22. In other words, the value of the instruction fetch stop signal input to the cores 121 changes from 1 to 0. If the value of the instruction fetch stop signal changes from 1 to 0, the cores 121 perform an instruction fetch from the boot firmware program stored in the reset address of the cache 122 pointed by the PC registers 124, and store instruction code into the instruction registers 123. The cores 121 then execute the instruction code stored in the instruction registers 123.

The cores 121 execute the instruction code obtained from the boot firmware program to perform the following processing. Initially, the cores 121 perform a POST to do an operation test inside the CPU 12. If serious failures are not detected by the POST and operations can be continued, the cores 121 initialize the SDRAM 13. The cores 121 then start refreshing the SDRAM 13. The SDRAM 13 hereafter retains written data and operates as a main storage device.

After the SDRAM 13 starts to operate as a main storage device, the cores 121 execute the instruction code obtained from the boot firmware program to perform the following processing. The cores 121 copy the boot firmware program stored in the cache 122 to the SDRAM 13. The cores 121 further initialize a data area on the SDRAM 13 to be used for the execution of the boot firmware program. The cores 121 further change the cache 122 into a mode in which the cache 122 operates as a cache of the SDRAM 13.

Next, the cores 121 make a change to execute the following boot processing by using the boot firmware program stored in the SDRAM 13. Such processing may be referred to as that the cores 121 are made to jump to the boot firmware program on the SDRAM 13. This processing is also implemented by the cores 121 executing the instruction code obtained from the boot firmware program. Consequently, the cores 121 hereafter operate by using the SDRAM 13 both as a program storage area and as a data storage area when executing the boot firmware program.

The cores 121 then execute the boot firmware program on the SDRAM 13 to perform the following processing. The cores 121 initialize the hardware of the server computer 1 other than the service processor 11, the CPU 12, or the SDRAM 13 (for example, the IO controller 15, the external storage device 16, and the network interface controller 17). The cores 121 then read an OS boot loader, for example, from the external storage device 16. The cores 121 further execute the read OS boot loader. In the present embodiment, the cores 121 read the OS boot loader from the external storage device 16, whereas the location to read an OS from is not limited thereto. For example, the cores 121 may read an OS from a network 3. The foregoing processing is performed by each individual core 121.

The IO controller 15 controls reading and writing of data from/to the external storage device 16. The external storage device 16 is an auxiliary storage device such as a hard disk. The network interface controller 17 is an interface for connecting to the network 3.

Next, a flow of processing of the server computer 1 at boot time and the move of the boot firmware program will be collectively described with reference to FIGS. 2 to 7. FIGS. 2 to 7 are first to sixth diagrams for describing the operation at boot time of the server computer according to the embodiment, respectively.

Figure 2:
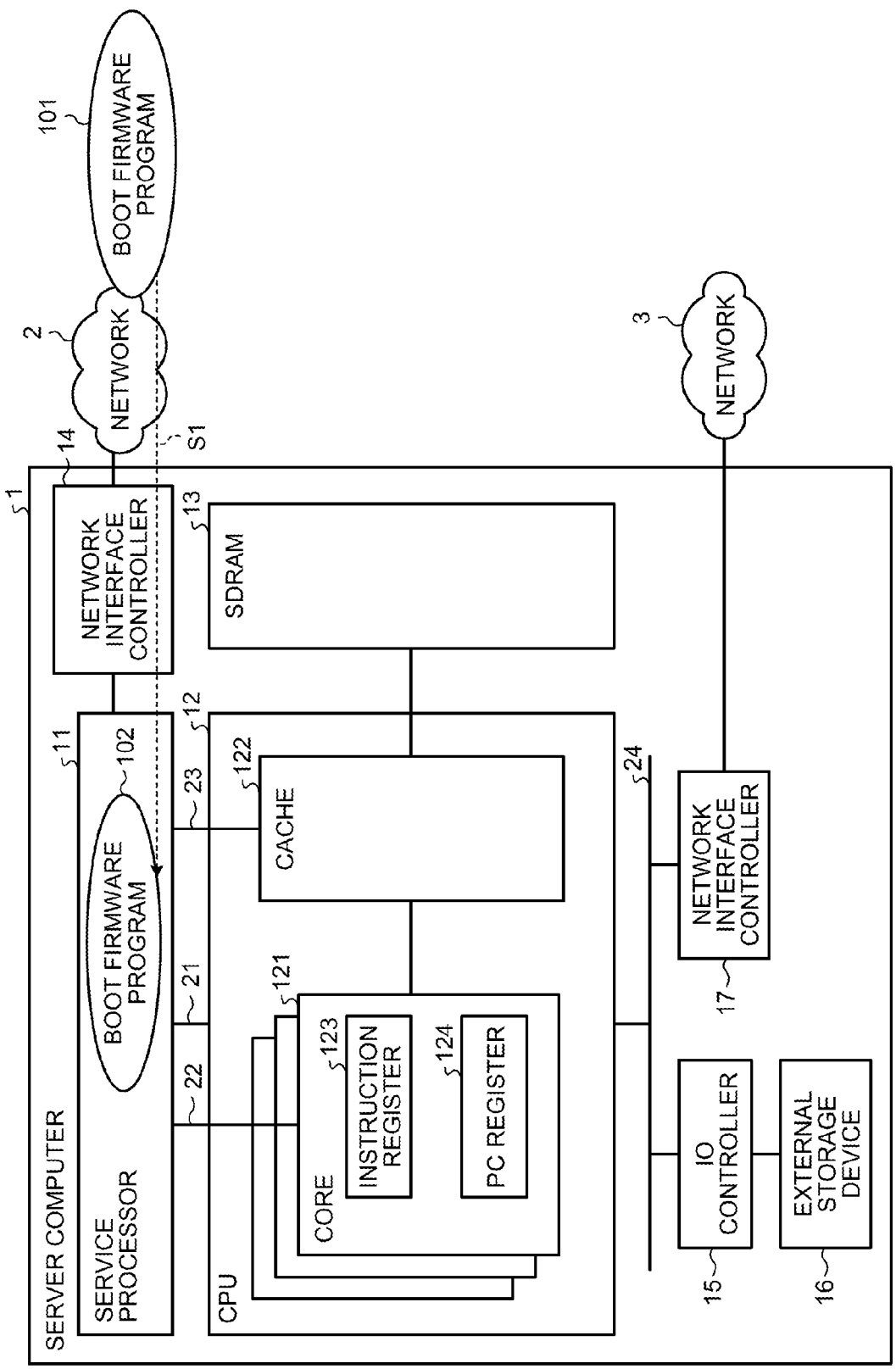
FIG. 2 is a first diagram for explaining an operation at boot time of the server computer according to the embodiment.

As illustrated in FIG. 2, the service processor 11 obtains a boot firmware program 101 on the network 2 (step S1). In FIG. 2, in step S1, the boot firmware program obtained by the service processor 11 is illustrated as a boot firmware program 102.

Figure 3:
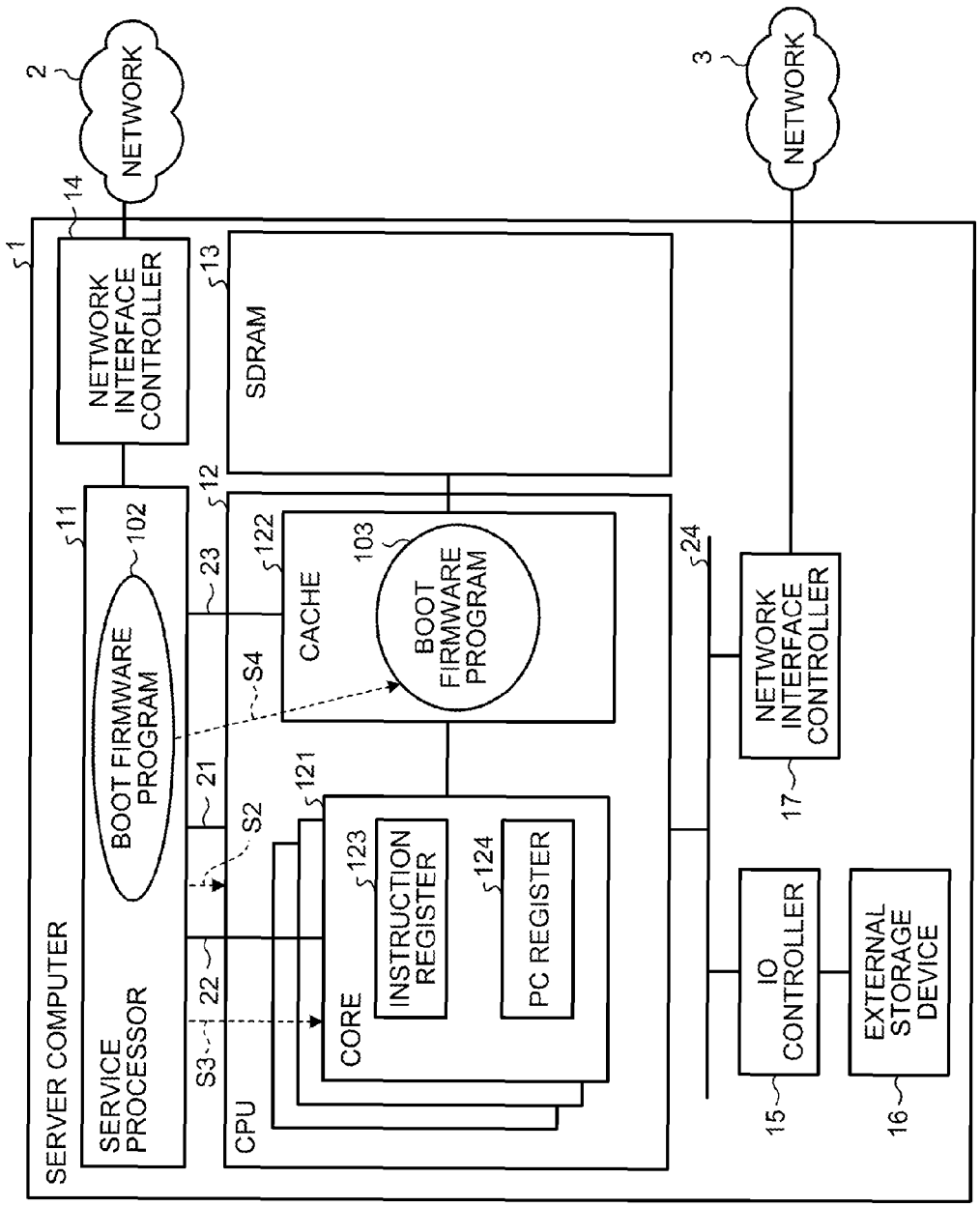
FIG. 3 is a second diagram for explaining the operation at boot time of the server computer according to the embodiment.

Next, as illustrated in FIG. 3, the service processor 11 outputs 1 as the reset signal to the CPU 12 via the reset signal line 21 (step S2). The service processor 11 outputs 1 as the instruction fetch stop signal to the cores 121 via the instruction fetch stop signal line 22 (step S3). Next, the service processor 11 transmits the boot firmware program 102 to the cache 122 via the CPU-SVP data bus 23 so that the boot firmware program 102 is stored in the cache 122 as a boot firmware program 103 (step S4).

Figure 4:
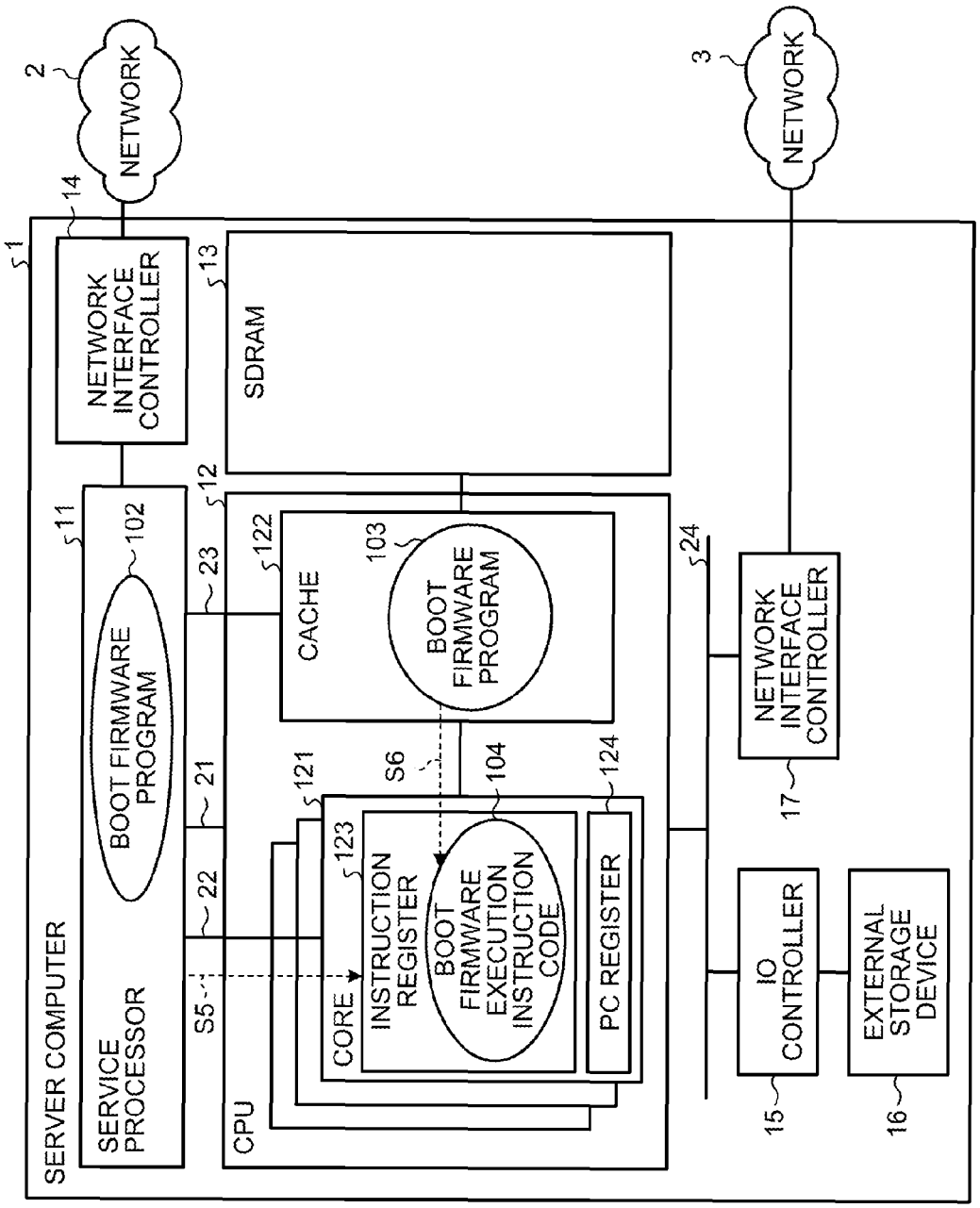
FIG. 4 is a third diagram for explaining the operation at boot time of the server computer according to the embodiment.

Next, as illustrated in FIG. 4, the service processor 11 outputs 0 as the instruction fetch stop signal to the cores 121 via the instruction fetch stop signal line 22 (step S5). When the input instruction fetch stop signal is changed to 0, the cores 121 obtain the reset address of the cache 122 stored in the PC registers 124. The cores 121 then perform an instruction fetch from the boot firmware program 103 stored in the obtained reset address of the cache 122, store boot firmware execution instruction code 104 into the instruction registers 123, and execute the boot firmware execution instruction code 104 (step S6). Here, the cores 121 perform a POST to test operations inside the CPU 12.

Figure 5:
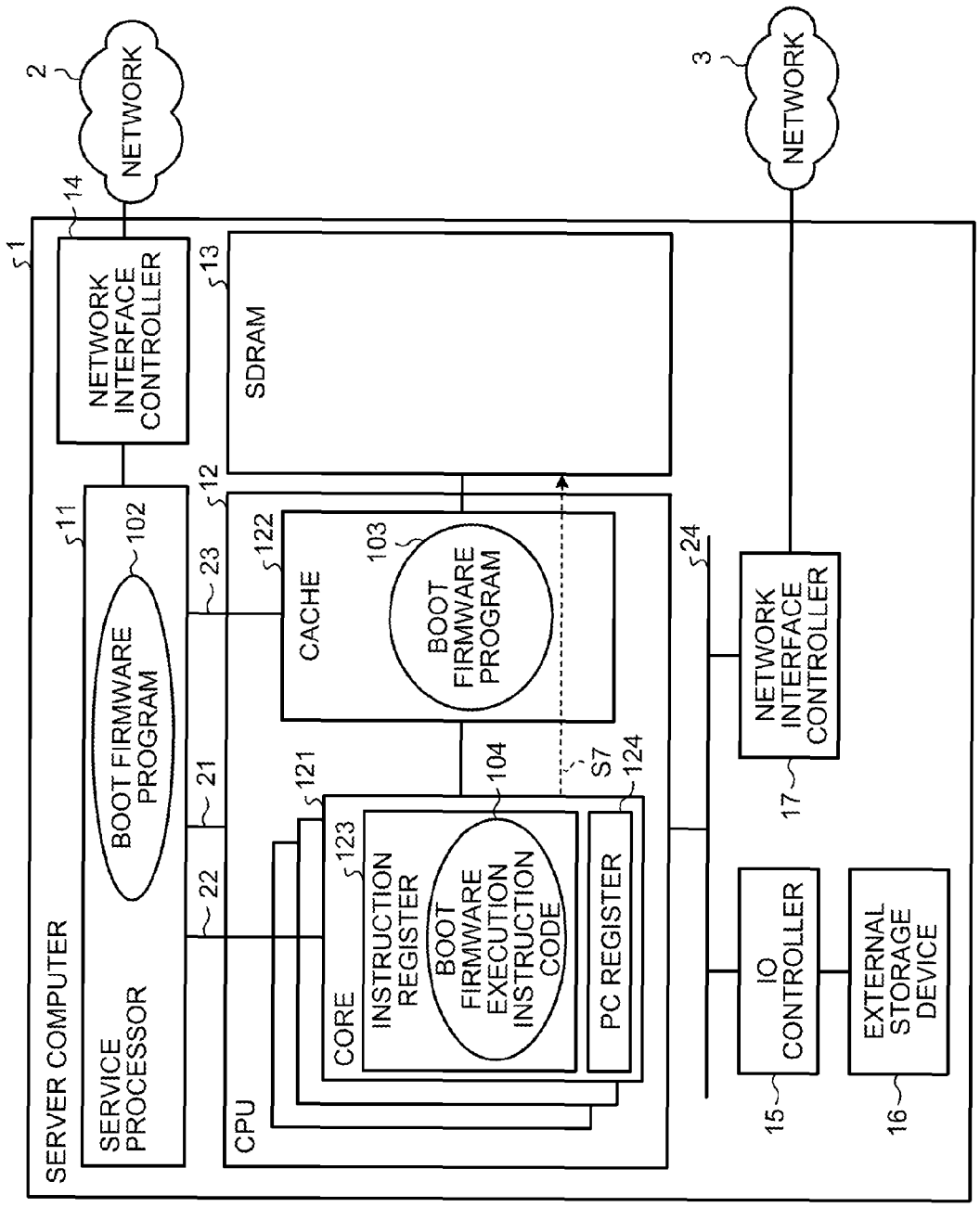
FIG. 5 is a fourth diagram for explaining the operation at boot time of the server computer according to the embodiment.

If serious failures are not detected by the POST and operations can be continued, as illustrated in FIG. 5, the cores 121 initialize the SDRAM 13 and then start refresh (step S7).

Figure 6:
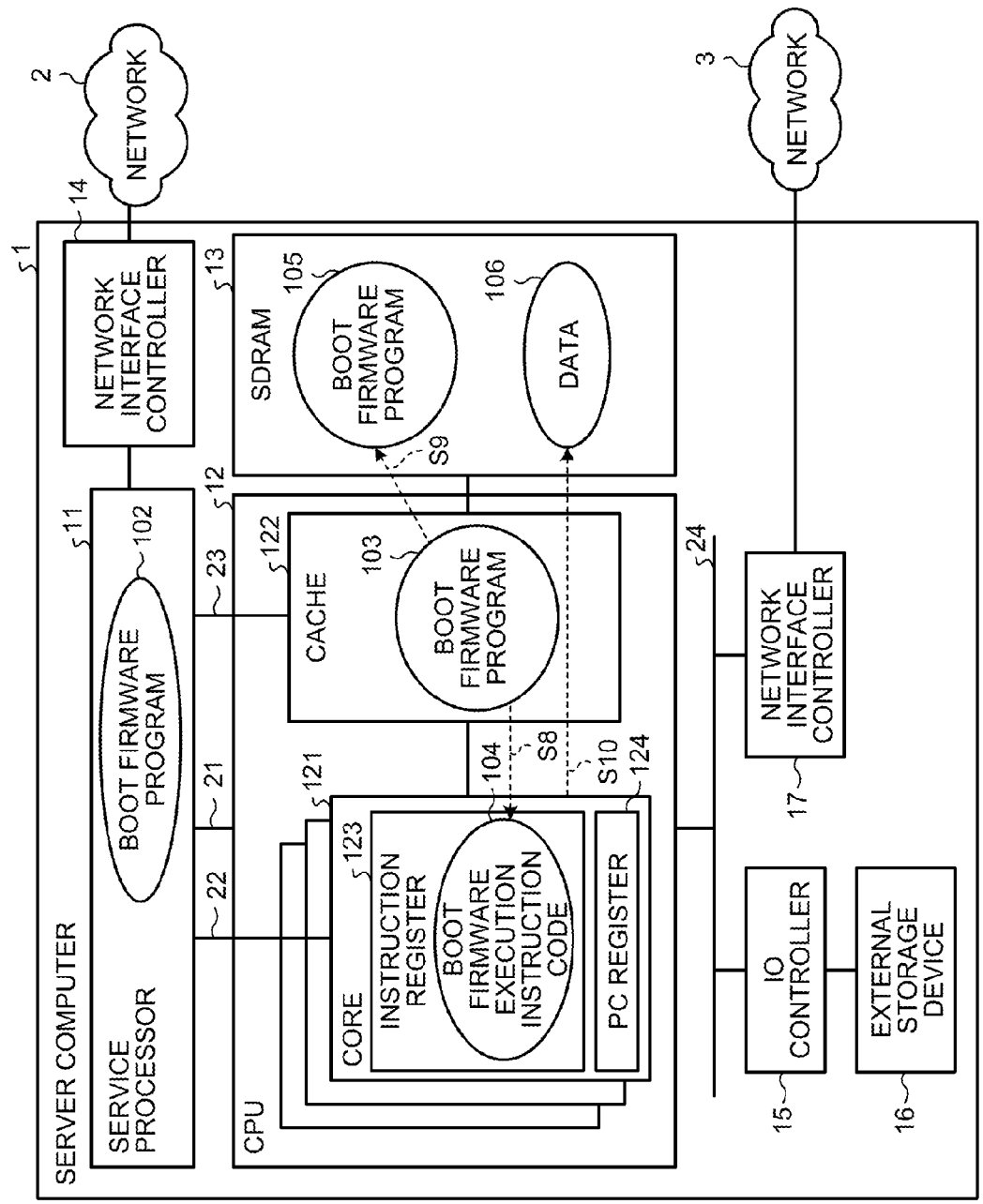
FIG. 6 is a fifth diagram for explaining the operation at boot time of the server computer according to the embodiment.

Next, as illustrated in FIG. 6, the cores 121 perform an instruction fetch from the boot firmware program 103 on the cache 122 (step S8) to perform the following processing. The cores 121 copies the boot firmware program 103 stored in the cache 122 to the SDRAM 13, so that the boot firmware program 103 is stored in the SDRAM 13 as a boot firmware program 105 (step S9). The cores 121 further initialize the data area to be used for the execution of the boot firmware program on the SDRAM 13 (step S10).

Figure 7:
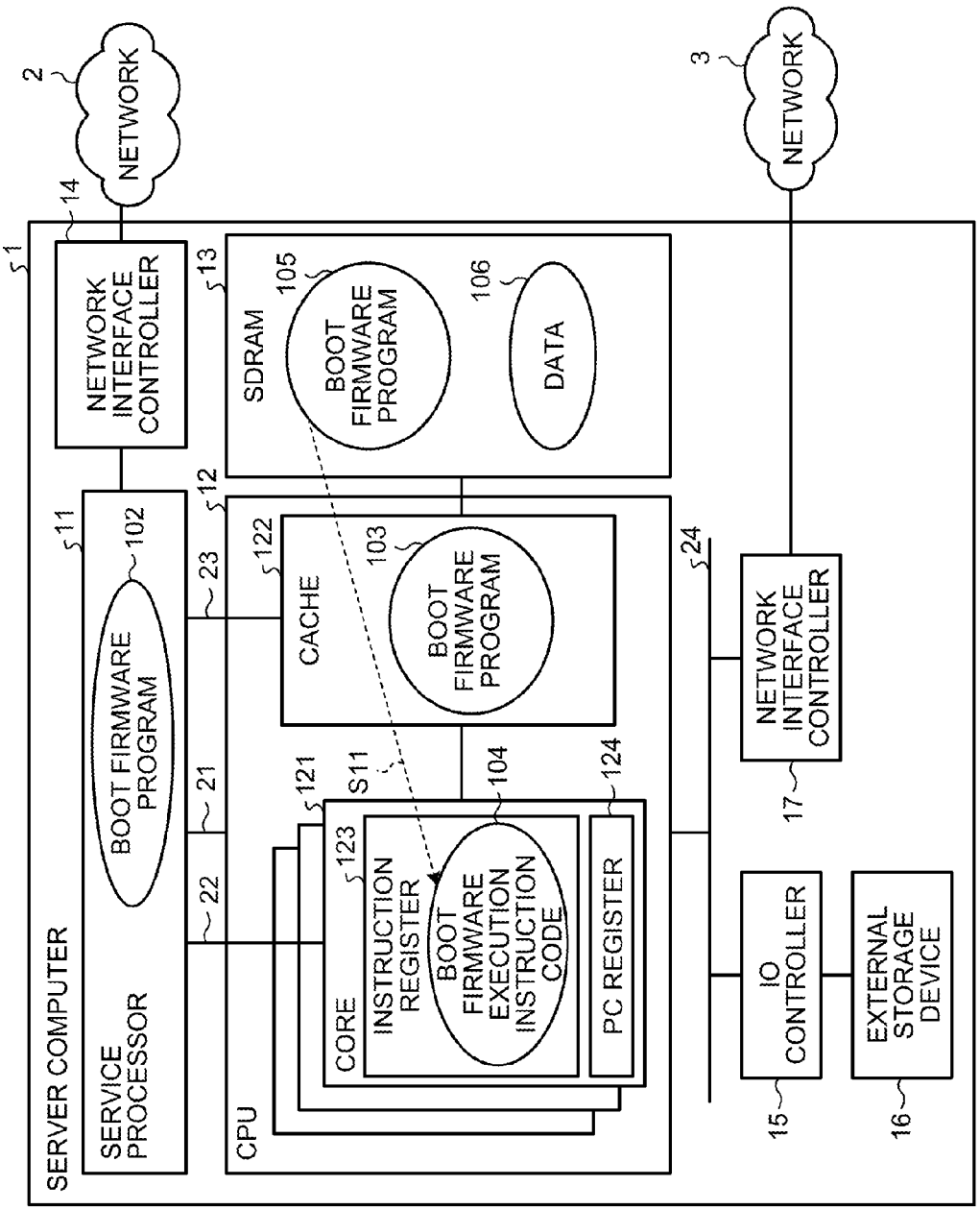
FIG. 7 is a sixth diagram for explaining the operation at boot time of the server computer according to the embodiment.

The cores 121 then change the program to execute to the boot firmware program 105 on the SDRAM 13. As illustrated in FIG. 7, the cores 121 then perform an instruction fetch from the boot firmware program 105 on the SDRAM 13, store boot firmware execution instruction code 107 into the instruction registers 123, and execute the boot firmware execution instruction code 107 (step S11). Here, the cores 121 store data 106 into the initialized data area on the SDRAM 13 while executing the boot firmware program. The cores 121 thereby initialize the hardware of the server computer 1 other than the service processor 11, the CPU 12, or the SDRAM 13. The cores 121 further read the OS boot loader from the external storage device 16 and execute the read OS boot loader.

Figure 8:
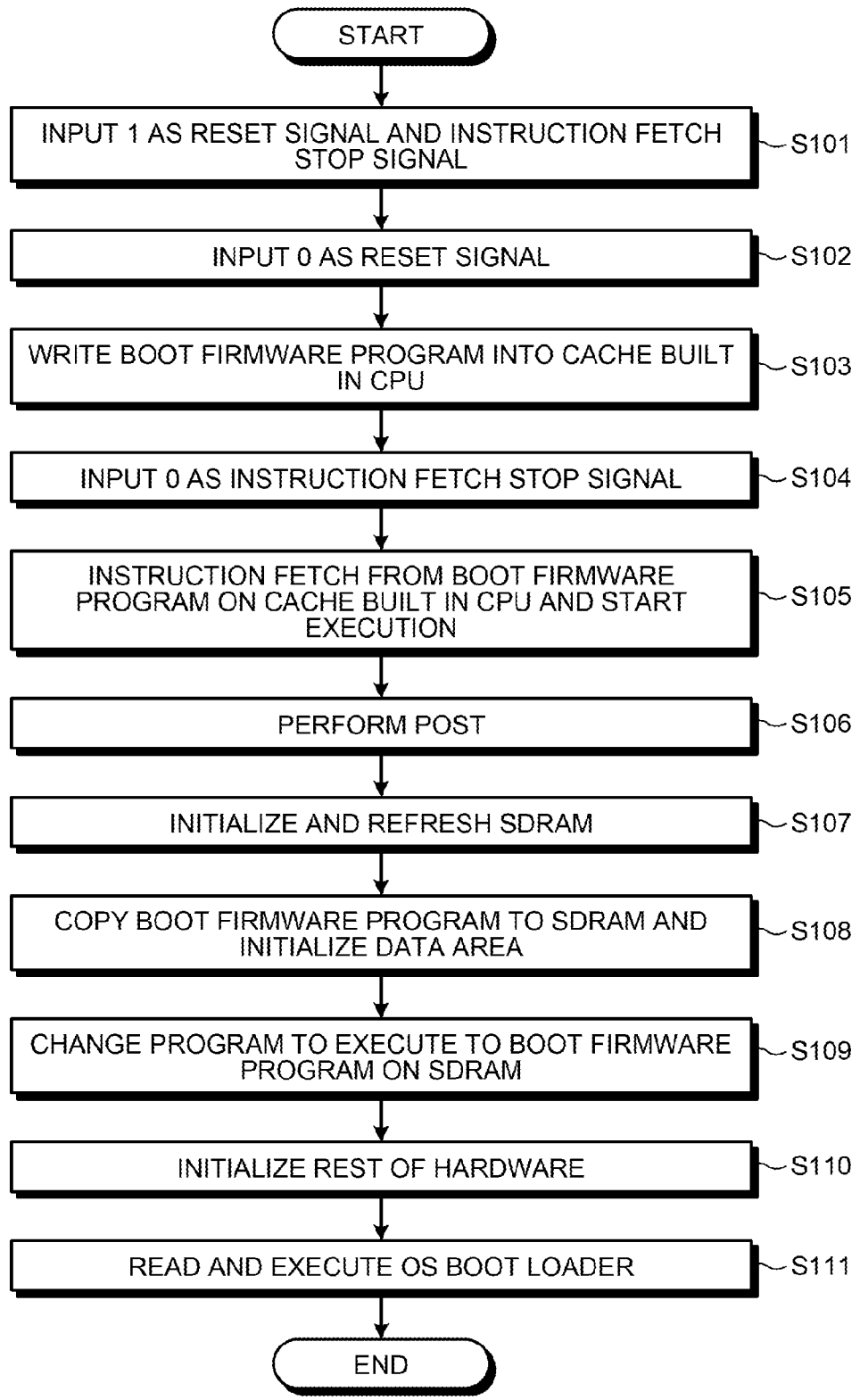
FIG. 8 is a flow chart of boot processing of the server computer according to the embodiment.
Figure 9:
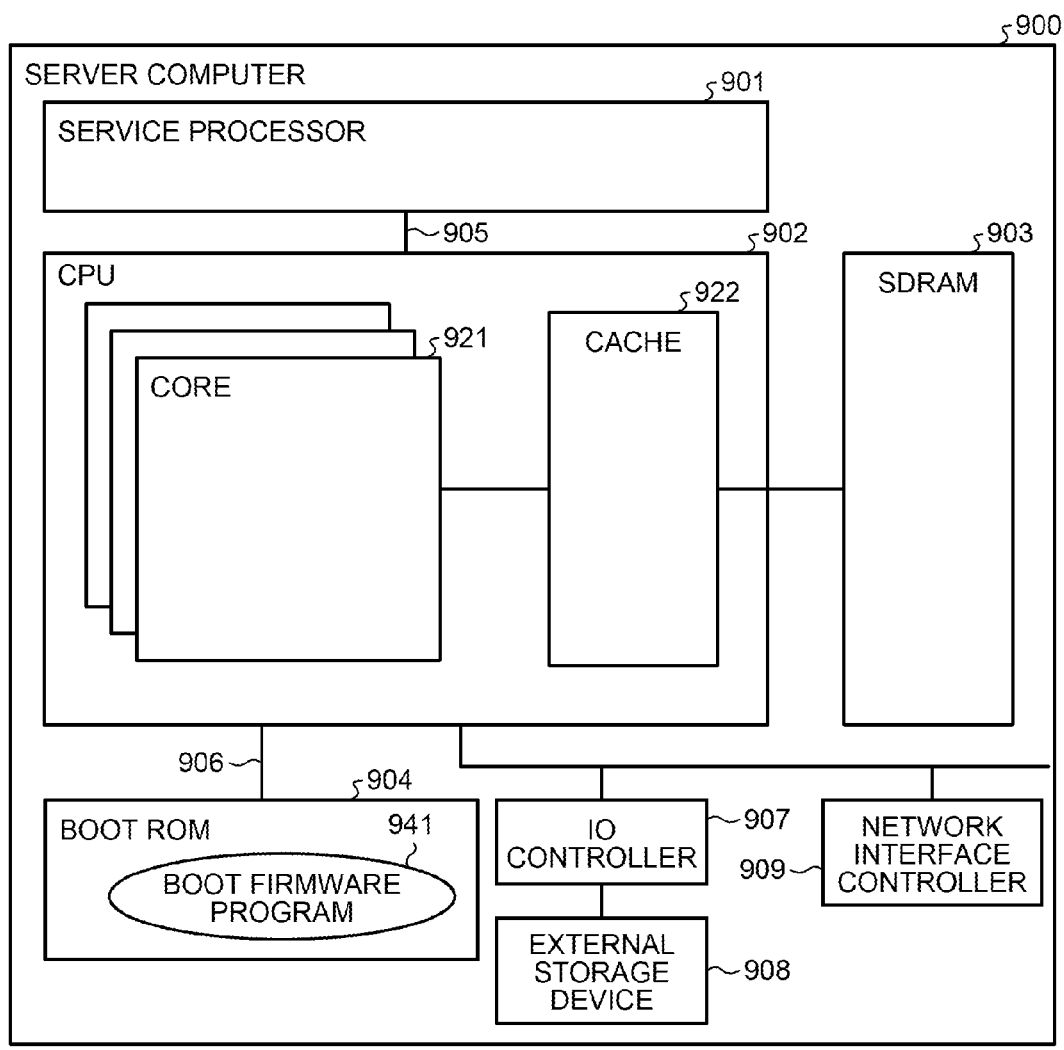
FIG. 9 is a diagram illustrating an example of a conventional server computer including a service processor.

The flow of the boot processing by the server computer according to the present embodiment will be further described with reference to FIG. 8. FIG. 8 is a flow chart of the boot processing of the server computer according to the present embodiment.

The service processor 11 inputs 1 as the reset signal to the CPU 12. The service processor 11 also inputs 1 as the instruction fetch stop signal to the cores 121 (step S101).

Next, the service processor 11 inputs 0 as the reset signal (step S102). In other words, the reset signal input to the CPU 12 changes from 1 to 0.

Next, the service processor 11 writes the boot firmware program into the cache 122 built in the CPU 12 (step S103).

The service processor 11 then inputs 0 as the instruction fetch stop signal (step S104). In other words, the input fetch stop signal input to the cores 121 changes from 1 to 0.

The cores 121 perform an instruction fetch from the boot firmware program stored in the reset address of the cache 122 built in the CPU 12, and execute the boot firmware execution instruction code 104 (step S105).

The cores 121 then perform a POST (step S106).

If serious failures are not detected by the POST and operations can be continued, the cores 121 initialize and refresh the SDRAM 13 (step S107).

The cores 121 further copy the boot firmware program stored in the cache 122 to the SDRAM 13. The cores 121 initialize the data area of the SDRAM 13 to be used for the execution of the boot firmware program (step S108).

The cores 121 then change the program to execute to the boot firmware program on the SDRAM 13 (step S109).

Subsequently, the cores 121 execute the boot firmware program on the SDRAM 13 to initialize the rest of the hardware of the server computer 1 other than the service processor 11, the CPU 12, or the SDRAM 13 (step S110).

The cores 121 then read the OS boot loader from the external storage device 16 and execute the OS boot loader (step S111).

As described above, the information processing apparatus according to the present embodiment does not need to include a boot ROM containing the boot firmware program. This can suppress the manufacturing cost of the entire product.

The information processing apparatus according to the present embodiment fetches instructions of the boot firmware program from the cache built in the CPU and execute the instructions. The execution speed is therefore faster than with the conventional technique in which instructions are fetched from the boot firmware program on the main storage device. The information processing apparatus according to the present embodiment has an execution speed even faster than when using a boot firmware program stored in a cache outside the CPU.

Moreover, the information processing apparatus according to the present embodiment can obtain the boot firmware program from outside. This eliminates the need to rewrite the boot ROM when the boot firmware program is updated. The writing speed of the ROM is lower than that of the operations of the CPU and SDRAM, and the update operation takes time. The information processing apparatus according to the present embodiment can reduce such a time-consuming update operation of the boot ROM.

According to an aspect of the information processing apparatus, the method for controlling the information processing apparatus, and the control program of the information processing apparatus disclosed in the present application, the effect of enabling a reduction in product cost is obtained.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing apparatus comprising:
a main storage unit;
a processor that includes a built-in storage unit for a starting program to be stored in, executes an instruction fetch and the starting program stored in the built-in storage unit alone to activate the main storage unit, and performs a startup of the information processing apparatus by using the activated main storage unit; and
a program transmission unit that puts the processor on standby for the execution of a reset, puts the processor into a state in which the instruction fetch is stopped, then makes the processor perform the reset, receives the starting program from an external machine, transmits the starting program, and makes the processor execute the instruction fetch
wherein the processor activates the main storage unit by executing the starting program stored in the built-in storage unit to initialize the main storage unit and transmit a reset signal to the main storage unit.

2. The information processing apparatus according to claim 1, wherein:
the program transmission unit resets the processor and stores the starting program into the built-in storage unit.

3. The information processing apparatus according to claim 2, wherein the program transmission unit stops an instruction fetch of the processor and the starting program is stored in the built-in storage unit.

4. The information processing apparatus according to claim 2, wherein the processor, when reset by the program transmission unit, makes the built-in storage unit operate as a storage device having a fixed physical address to be accessed, sets an instruction fetch start address at a fixed address of the built-in storage unit, store an instruction code into an instruction register by executing an instruction fetch, and executes the instruction code to activate the main storage unit.

5. The information processing apparatus according to claim 1, wherein:
the program transmission unit is constantly supplied with power, and transmits the starting program when receiving a start instruction; and
the processor and the main storage unit start being supplied with power when the program transmission unit receives the start instruction.

6. The information processing apparatus according to claim 1, wherein the program transmission unit obtains the starting program from another apparatus.

7. The information processing apparatus according to claim 1, further comprising an auxiliary storage device, wherein
the processor activates the auxiliary storage device by using the starting program stored in the main storage unit.

8. The information processing apparatus according to claim 1, wherein the processor makes the built-in storage unit operate as a storage device having a fixed physical address to be accessed, and executes the starting program stored in the built-in storage unit.

9. A method for controlling an information processing apparatus, the information processing apparatus including a first processor, a second processor, and a main storage unit, the first processor including a built-in storage unit, the method comprising:
putting the first processor on standby for an execution of a reset: putting the first processor into a state in which an instruction fetch is stopped:
performing the reset by the first processor: receiving a staring program from an external machine by the second processor:
storing the starting program into the built-in storage unit by the second processor;
executing the instruction fetch and the starting program stored in the built-in storage unit alone to activate the main storage unit by the first processor; and
performing a startup of the information processing apparatus by using the activated main storage unit by the first processor
wherein the first processor activates the man storage unit by executing the starting program stored in the built-in storage unit to initialize the main storage unit and transmit a reset signal to the main storage unit.

10. A non-transitory computer-readable recording medium having stored therein a control program of an information processing apparatus, the information processing apparatus including a first processor, a second processor, and a main processing unit, the first processor including a storage unit, the control program
causing the second processor to perform putting the first processor on standby for an execution of a reset, putting the first processor into a state in which an instruction fetch is stopped, performing the reset by the first processor, receiving a staring program from an external machine, and processing for storing the starting program into the built-in storage unit, and
causing the first processor to perform processing for executing the fetch and the starting program stored in the built-in storage unit alone to activate the main storage unit, and starting up the information processing apparatus by using the activated main storage unit
wherein the first processor activates the main storage unit by executing the starting program stored in the built-in storage unit to initialize the main storage unit and transmit a reset signal to the main storage unit.

11. The information processing apparatus according to claim 1, wherein:
the program transmission unit, when receiving a boot instruction to the information processing apparatus from the external machine, receives the staring program from the external machine and transmits the starting program.

* * * * *